United States Patent
Cho

[11] 3,830,654
[45] Aug. 20, 1974

[54] OPTICAL DEVICES UTILIZING SINGLE CRYSTAL GaP OR GaAs FILMS EPITAXIALLY GROWN ON CaF$_2$ SUBSTRATES AND METHOD OF FABRICATING SAME

[75] Inventor: Alfred Yi Cho, New Providence, N.J.

[73] Assignee: Bell Telephone Laboratories, Incorporated, Murray Hill, Berkeley Heights, N.J.

[22] Filed: Jan. 30, 1970

[21] Appl. No.: 7,022

[52] U.S. Cl............... 117/201, 117/106 A, 148/1.5, 148/175, 350/96 WG
[51] Int. Cl....... B44d 1/02, B44d 1/18, C23c 13/02
[58] Field of Search ......... 117/201, 106 A; 148/1.5, 148/175; 350/96 WG, 96

[56] References Cited
UNITED STATES PATENTS
3,476,593  11/1969  Lehrer ........................... 117/106 A OTHER PUBLICATIONS
Brit. J. Appl. Phys., 1967, Vol. 18, Single-Crystal Films of Silicon on Insulators, p. 1,379 relied on.
Journal of Vacuum Science and Technology, July 1969, Vol. 6, QC166-J6, GaAs, GaP, and GaAs$_x$ P$_{1-x}$ Epitaxial Films Grown by Molecular Beam Deposition, p. 545–548.

Primary Examiner—Charles E. Van Horn
Assistant Examiner—Michael W. Ball
Attorney, Agent, or Firm—M. J. Urbano

[57] ABSTRACT

Single Crystal GaP or GaAs films are epitaxially grown on CaF$_2$ substrates by a molecular beam method. The film itself as well as the interface between the film and substrate exhibits few defects since the lattice constants of the film and substrate are substantially identical, thus making the films particularly useful as optical waveguides with reduced light scattering centers, or as nonlinear optical devices in which phase matching is readily accomplished by controlling the thickness of the film.

12 Claims, 3 Drawing Figures

PATENTED AUG 20 1974  3,830,654

INVENTOR
A. Y. CHO
BY Michael J. Urbano
ATTORNEY

3,830,654

OPTICAL DEVICES UTILIZING SINGLE CRYSTAL GaP OR GaAs FILMS EPITAXIALLY GROWN ON CaF₂ SUBSTRATES AND METHOD OF FABRICATING SAME

BACKGROUND OF THE INVENTION

This invention relates to the epitaxial growth of GaP or GaAs single crystal thin films of controllable thickness on CaF$_2$ substrates by a molecular beam method and to optical devices utilizing such films.

Prior art techniques for growing GaP or GaAs epitaxial thin films, which generally employ sputtering in a high pressure argon atmosphere, are disadvantageous for a number of reasons including: the inability to control the film thickness due to nonuniform current densities, contamination due to sputtering of spurious materials, and the inability to measure readily the substrate temperature due to ion bombardment of the temperature sensor. In addition, sputtering techniques grow only polycrystalline films, not single crystal films.

Progress has been made, however, in overcoming some of those difficulties. In a paper in the Journal of Vacuum Science and Technology, Vol. 6, 545 (July/August 1969), J. R. Arthur and J. J. LePore report the successful growth of epitaxial films of GaAs and GaP on GaAs and GaP substrates by molecular beam deposition in an ultrahigh vacuum. This technique allows the thickness of the film to be readily controlled but as indicated in the article, the films generally contained more defects than did the substrates.

For some device applications, notably optical waveguiding, it is desirable, in order to reduce light scattering, that the thin film in which light is being transmitted (e.g., the GaP film herein) be single crystal and substantially free of defects not only in the film itself but also at the film-substrate interface. In this respect, it is desirable that the substrate be a single crystal, that the guiding film be a single crystal with a lattice constant which substantially matches that of the substrate, but that the index of refraction of the film and substrate be different to provide the light guiding effect.

In other device applications, such as second harmonic generation or parametric oscillation which utilize the large nonlinear optical coefficient of materials such as GaP to convert pump radiation of one frequency to generated radiation of a different frequency, it is desirable that the efficiency of the nonlinear process be increased by phase matching the pump radiation to the generated radiation. For a given frequency and mode order, the velocity of propagation of radiation is proportional to the thickness of the nonlinear material. Thus, pump and generated radiation of different frequencies and/or mode orders can be made to have the same velocity (i.e., be phase matched) by an appropriate choice of material thickness.

It is, therefore, an object of this invention to grow single crystal epitaxial films of GaP or GaAs of controllable thickness.

It is a specific object of this invention to grow such films on a single crystal substrate of CaF$_2$ having a substantially identical lattice constant as the film but a different index of refraction.

SUMMARY OF THE INVENTION

These and other objects are accomplished in accordance with an illustrative embodiment of the invention in which single crystal GaP or GaAs thin films of controllable thickness are epitaxially grown on polished or cleaved CaF$_2$ surfaces (preferably the (111) plane) in an ultrahigh vacuum by molecular beam deposition. Since the plane of CaF$_2$ is (111) and the lattice constant is identical to that of GaP ($a$=5.45 A at room temperature) and only about 3.6 percent different than that of GaAs ($a$=5.65 A at room temperature), few defects are produced in the film itself or at the film-substrate interface, especially for GaP. This structure is useful as an optical waveguide with light being guided in the GaP or GaAs by the different indices of refraction ($n$=3.06 for GaP, $n$=3.26 for GaAs, $n$=1.43 for CaF$_2$). Thus, the waveguide may be an asymmetrical structure, e.g., air-GaP-CaF$_2$, or symmetrical, e.g., CaF$_2$-GaP-CaF$_2$. In addition, as mentioned previously, the molecular beam method allows for ready control of the thin film thickness, a useful feature in providing phase matching when the GaP or GaAs film is utilized in nonlinear optical devices.

BRIEF DESCRIPTION OF THE DRAWING

These and other objects of the invention, together with its various features and advantages, can be easily understood from the following more detailed description taken in conjunction with the accompanying drawing in which.

DETAILED DESCRIPTION

Figure 1:
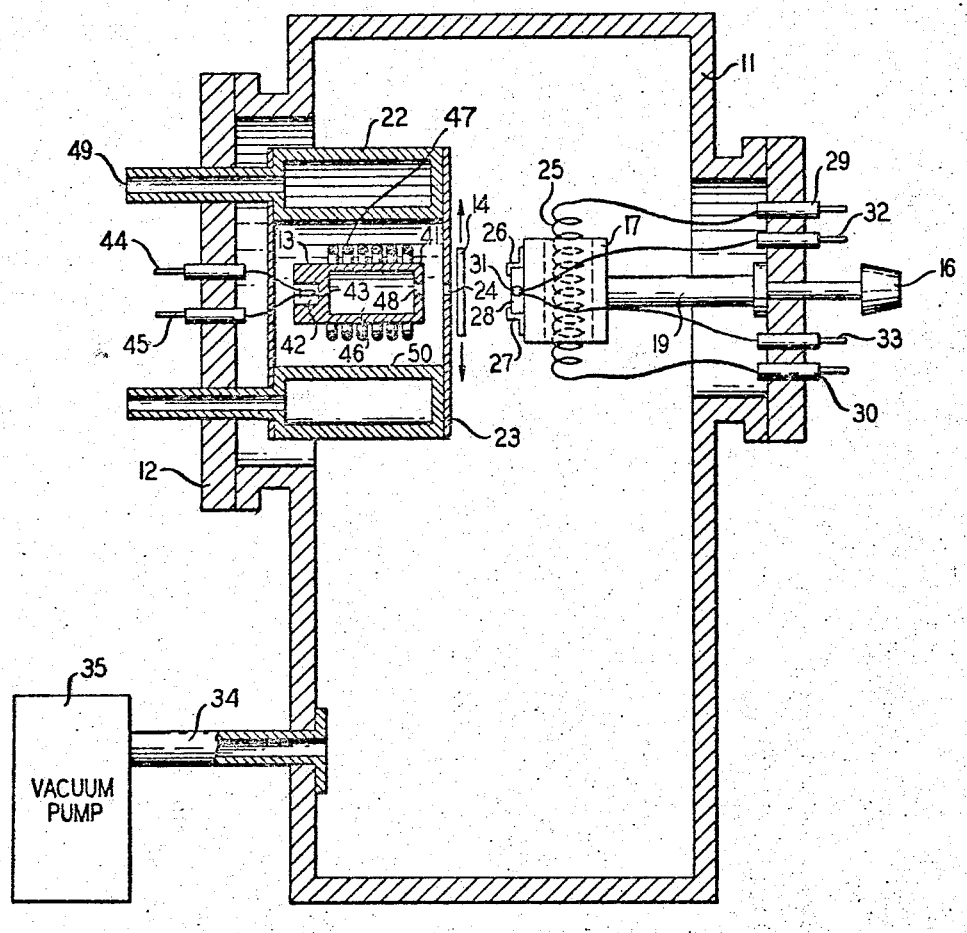
FIG. 1 is a partial schematic-partial cross-sectional view of apparatus for practicing the present invention.

Turning now to FIG. 1, there is shown apparatus in accordance with the invention for growing epitaxial films of GaP or GaAs of controllable thickness on a CaF$_2$ substrate by molecular beam deposition.

The apparatus comprises a vacuum chamber 11 having disposed therein a gun port 12 containing a cylindrical gun 13, typically a Knudsen cell, and a substrate holder 17, typically a molybdenum block, connected by means of shaft 19 to a control knob 16 exterior to chamber 11 capable of effecting rotary motion of holder 17. Optionally, a plurality of guns may be contained within the gun port in cases where it is desired to heat different source materials separately. Also shown disposed within chamber 11 is a cylindrical liquid nitrogen cooling shroud 22 which surrounds gun 13 and a collimating frame 23 having a collimating aperture 24. A movable shutter 14 is disposed in front of aperture 24. Substrate holder 17 is provided with an internal heater 25 and with clips 26 and 27 for affixing a substrate member 28 thereto. Additionally, a thermocouple is disposed in aperture 31 in the side of substrate 28 and is coupled externally via connectors 32–33 in order to sense the temperature of substrate 28. Chamber 11 also includes an outlet 34 for evacuating the chamber by means of a pump 35.

A typical cylindrical gun 13 comprises a refractory crucible 41 having a thermocouple well 42 and a thermocouple 43 inserted therein for the purpose of determining the temperature of the material contained therein. Thermocouple 43 is connected to an external detector (not shown) via connectors 44–45. Additionally, the crucible 41 has a source chamber 46 in which source material (e.g., bulk GaP) is inserted for evaporation by heating coil 47 which surrounds the crucible. The end of crucible 41 adjacent aperture 24 is provided with a knife-edge opening 48 of diameter preferably less than the average mean free path of atoms in the source chamber.

For purposes of exposition, the present invention will be described in detail by reference to an illustrative example wherein the various operating parameters are given.

The first step in the inventive technique involves selecting a single crystal $CaF_2$ member which may readily be obtained from commercial sources. One major surface of the $CaF_2$ substrate member is initially polished or cleaved by well-known methods along the (111) plane. While the use of other planes is possible, the (111) plane is preferred since it has approximately the same number of atoms and the same atom spacing as that of GaP and GaAs. If the substrate is polished, any disruption of the single crystal nature of the surface caused by polishing will be annealed by subsequent heating via heater 25. The nonreactive nature of $CaF_2$ insures the surface will be atomically clean. However, what few impurities might still remain typically are removed by the aforesaid heating.

Next, the $CaF_2$ substrate is placed in an apparatus of the type shown in FIG. 1, and thereafter, the background pressure in the vacuum chamber is reduced to less than $10^{-6}$ torr and preferably to a value of the order of $10^{-9}$ to $10^{-10}$ torr, thereby precluding the introduction of any deleterious components onto the substrate surface. The next steps in the process involve introducing liquid nitrogen into the cooling shroud via entrance port 49 and heating the substrate member to the growth temperature which ranges from 500°C–600°C dependent upon the specific material to be grown, such range being dictated by considerations relating to arrival rates and surface diffusion.

Following, the gun 13 employed in the system, which has previously been filled with the requisite amounts of the constituent of the desired films to be grown, is heated to a temperature ranging from 730°C–1,000°C sufficient to vaporize the contents thereof to yield (with shutter 14 open) a molecular beam; that is, a stream of atoms manifesting velocity components in the same direction, in this case toward the substrate surface. The atoms of molecules reflected from the surface strike the interior surface 50 of the cooled shroud 22 and are condensed, thereby insuring that only atoms or molecules from the molecular beam impinge upon the surface.

For the purposes of the present invention, the amount of source materials (GaP or GaAs) furnished to the gun 13 must be sufficient to provide an excess of $P_2$ or $As_2$ with respect to Ga. This condition arises from the large differences in sticking (i.e., condensation) coefficient of the several materials; namely, unity for Ga and $10^{-2}$ for $P_2$ on GaP surface, the latter increasing to unity when there is an excess of Ga on the surface. Therefore, as long as the $P_2$ arrival rate is higher than that of Ga, the growth will be stoichiometric. Similar considerations apply to Ga and As.

Growth of the desired epitaxial film is effected by directing the molecular beam generated by gun 13 at the collimator 23 which functions to remove velocity components therein in directions other than those desired, thereby permitting the desired beam to pass through the collimating aperture 24 to effect reaction at the substrate surface. Growth is continued for a time period sufficient to yield an epitaxial film of the desired thickness, a feature of the subject technique residing in the controlled growth of films of thickness ranging from a single monolayer (about 3 A) to more than 2,000 A.

The reason which dictates the use of the aforementioned temperature ranges can be understood as follows. It is now known that Group III–V elements contained in compound semiconductors are adsorbed upon the surface of single crystal semiconductors at varying rates, the V elements typically being almost entirely reflected therefrom in the absence of III elements. However, the growth of stoichiometric III–V semiconductor compounds may be effected by providing vapors of Group III and V elements at the substrate surface, an excess of Group V element being present with respect to the III element, thereby assuring that the entirety of the III element will be consumed while the nonreacted V excess is reflected. In this connection, the aforementioned substrate temperature range is related to the arrival rate and surface mobility of atoms striking the surface, i.e., the surface temperature must be high enough (500°C–600°C) that impinging atoms have enough thermal energy to be able to migrate to favorable surface sites (potential wells) to form the epitaxial layer. The higher the arrival rate of these impinging atoms, the higher must be the substrate temperature. For substrate temperatures less than 500°C twinning at the surface tends to occur, whereas for temperatures greater than 600°C facets of (110) faces tend to occur in the surface. In addition, noncongruent evaporation of GaP occurs at temperatures greater than 680°C. Similarly, the cell temperature must be high enough (>730°C) to produce appreciable evaporation and yet not so high (<1,000°C) that the higher arrival rate of the V element will result in most of the V element being reflected from the surface before being trapped there by the III element.

The following examples of the present invention are given by way of illustration and are not to be construed as limitations, many variations being possible within the spirit and scope of the invention.

Example I

This example describes a process for the growth of an epitaxial film of single crystal gallium phosphide upon a calcium fluoride substrate member.

A calcium fluoride substrate member obtained from commercial sources was cleaved along its (111) plane by conventional techniques and inserted in an apparatus of the type shown in FIG. 1. In the apparatus actually employed, a single graphite Knudsen cell was contained in the gun port, one gram of gallium phosphide polycrystals being placed in the source chamber of the cell. Following, the vacuum chamber was evacuated to a background pressure of the order of $10^{-9}$ torr and the substrate, with its cleaved (111) surface (about 1 cm × 1 cm) facing the gun, was preheated to a temperature of approximately 537°C (810°K) for about 10 minutes prior to deposition. Low energy electron diffraction showed that this thermal treatment resulted in hexagonal diffraction which is expected for a clean $CaF_2$ surface. Accurate measurement of the substrate temperature, which is important to molecular beam epitaxial growth, was accomplished by imbedding a chromel-alumel thermocouple in a hole 10 mil in diameter in the substrate. A tungsten-5 percent versus tungsten-26 percent rhenium thermocouple was used for measurement of the Knudsen cell temperature. The thermocouple reading for the cell was calibrated with a pyrometer looking directly into the effusion orifice. At this time, liquid nitrogen was introduced into the cooling shroud and the Knudsen cell heated to a temperature of 903°C (1,176°K), thereby resulting in vaporization of the gallium phosphide polycrystals contained therein and the consequent flow of molecular beams toward the collimating frame which removed velocity components in the beams which were undesirable. With the shutter open, the beams were focused upon the substrate surface for a period of 40 minutes, so resulting in the growth of an epitaxial film 200 A in thickness of gallium phosphide upon the substrate. With the shutter open for 4 minutes and 400 minutes, films of 20 A and 2,000 A thickness, respectively, were readily obtained. The lateral dimensions of the film may be controlled by well-known masking techniques or merely by appropriate choice of the substrate size.

At the above temperatures the molecular beam consisted of three species: Ga, $P_2$, and $P_4$ with the corresponding vapor pressures in the cell being $5.4 \times 10^{-7}$ atm, $5.4 \times 10^{-6}$ atm and $5.4 \times 10^{-9}$ atm. The arrival rates of these three species on the $CaF_2$ substrate located 10 cm. away from the Knudsen cell can be readily calculated to be $2.65 \times 10^{13}$ Ga/cm$^2$/sec, $2.82 \times 10^{14}$ $P_2$/cm$^2$/sec and $1.99 \times 10^{11}$ $P_4$/cm$^2$/sec. Notwithstanding these differences in arrival rates, the GaP films were shown to be stoichiometric (i.e., single crystal) and to exhibit the properties of bulk GaP on the basis of both electron diffraction measurements of lattice spacings used to determine the single crystal structure and optical measurements of transmittance which provide information concerning the electronic band structures of the film.

Example II

The procedure of Example I was repeated at the same temperatures but with the source chamber containing one gram of GaAs polycrystals also obtained from commercial sources. With the cleaved $CaF_2$ substrate once again positioned 10 cm. away from the Knudsen cell, the molecular beam consisted of three species: Ga, $As_2$, and $As_4$ having arrival rates of about $3.93 \times 10^{13}$ Ga/cm$^2$/sec, $5.03 \times 10^{14}$ $As_2$/cm$^2$/sec and $1.19 \times 10^{13}$ $As_4$/cm$^2$/sec. A film of 200 A thickness was produced with the shutter open for 26 minutes. Using the same techniques as in Example I, the GaAs films were also shown to be single crystal and therefore stoichiometric.

Example III

Each of Examples I and II were repeated using, however, a $CaF_2$ crystal polished along its (111) plane with diamond paste. The polished crystal was then repeatedly rinsed in acetone and finally in ethyl alcohol before mounting in the apparatus of FIG. 1. The $CaF_2$ surface thus prepared exhibited polycrystalline diffraction patterns which, however, changed to a single crystal pattern after thermal cleaning and annealing at 650°C for 15 minutes. Molecular beam deposition of GaP and GaAs on this polished surface produced single crystal diffraction patterns similar to those produced when a cleaved $CaF_2$ surface was used.

Example IV

The above examples showed that the minimum substrate temperature for the growth of untwinned epitaxial single crystal films of GaP were about 65° lower for GaP grown on a GaP film than for GaP on a cleaved $CaF_2$ surface. Similarly, the minimum temperature was about 105° lower when a polished $CaF_2$ surface was used. Therefore, to grow GaP on $CaF_2$ at reduced temperatures, the first 50 monolayers (approximately) should be grown at an elevated substrate temperature (e.g., 590°C for polished $CaF_2$ and 550°C for cleaved $CaF_2$) and then the substrate temperature could be decreased by 65° or 105° depending on whether a cleaved or polished substrate is used.

Optical Waveguides

Figure 2:
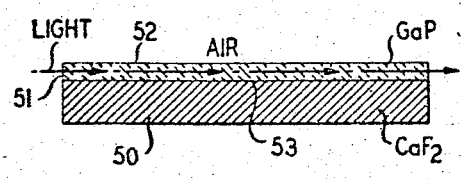
FIG. 2 is a schematic of an asymmetrical optical waveguide in accordance with one embodiment of the invention.
Figure 3:
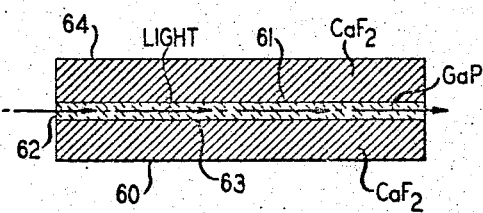
FIG. 3 is a schematic of a symmetrical optical waveguide in accordance with a second embodiment of the invention.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, the lack of defects (i.e., light scattering centers) in the single crystal films grown as described above, in combination with the near identity of lattice constants between the films and the $CaF_2$ substrate, make these films especially attractive for use as optical waveguides. An asymmetrical waveguide is shown in FIG. 2 as comprising a $CaF_2$ substrate 50 upon which is grown as previously described an epitaxial thin film 51 of single crystal GaP. Two parallel interfaces, 52 and 53, are formed by differing indices of refraction. The former is an air (or other gas, or vacuum) GaP interface while the latter is a GaP-$CaF_2$ interface. Light is directed into one end of the GaP film which guides the line in a plane parallel to the interfaces. Similarly, FIG. 3 shows a symmetrical waveguide formed by a $CaF_2$ substrate 60 on which is grown as previously described an epitaxial thin film 62 of single crystal GaP. Additionally, another layer 64 of $CaF_2$, which need not be single crystal since light is not transmitted therethrough, is grown on the GaP film by well-known techniques such as sputtering or evaporation.

As before, two interfaces 61 and 63 are formed by the differing indices of refraction of the GaP and $CaF_2$ films. Light entering one end of the GaP film is therefore effectively guided in a plane parallel to the interfaces.

The above-described GaP waveguides are useful in guiding light of radiation ranging from about $0.55\mu$ in the green-visible to $2-5\mu$ in the infrared. Similar structures utilizing GaAs are capable of guiding light in the infrared ranging from about $0.9\mu$ to $2-5\mu$.

What is claimed is:

1. A method for the growth of an epitaxial single crystal film of a material selected from the group consisting of gallium arsenide and gallium phosphide upon a single crystal calcium fluoride surface which comprises the steps of reducing the background pressure to a subatmospheric pressure, preheating said substrate to a temperature within the range of 500°C–600°C, and focusing at least one collimated molecular beam comprising the constituent components of the desired epitaxial film upon said preheated substrate for a time period sufficient to effect growth of a film of said material of the desired thickness.

2. The method of claim 1 wherein said calcium fluoride substrate possesses an atomically clean surface upon which said film is grown.

3. The method of claim 2 wherein said background pressure is less than $1 \times 10^{-9}$ torr.

4. The method of claim 2 wherein said calcium fluoride surface is a cleaved (111) surface.

5. The method of claim 4 wherein said material is GaP and including the steps of initially heating said substrate to a temperature within said range of 500°C–600°C until approximately 50 monolayers of epitaxial GaP are formed on said surface and then reducing said temperature by about 65°.

6. The method of claim 2 wherein said calcium fluoride surface is a polished (111) surface.

7. The method of claim 6 including the step of preheating said substrate to a temperature greater than 600°C for a period of time sufficient to clean and anneal said surface.

8. The method of claim 7 wherein said material is GaP and including the subsequent steps of heating said substrate to a temperature within said range of 500°C–600°C until approximately 50 monolayers of epitaxial GaP are formed on said surface and then reducing said temperature by about 105°.

9. The method in accordance with claim 1 wherein said molecular beam is formed by heating at least one gun member containing the constituent components of the desired epitaxial film to a temperature sufficient to vaporize said components and permitting the resultant vapor to impinge upon a collimating frame.

10. The method of claim 9 wherein said gun member is heated to a temperature in the range of 730°C–1,000°C.

11. The method in accordance with claim 9 wherein said gun member contains gallium arsenide.

12. The method in accordance with claim 9 wherein said gun member contains gallium phosphide.

* * * * *